Oct. 29, 1929.  F. V. LAVERTY  1,733,995
AUTOMOBILE CUSPIDOR
Filed Nov. 30, 1928    2 Sheets-Sheet 1
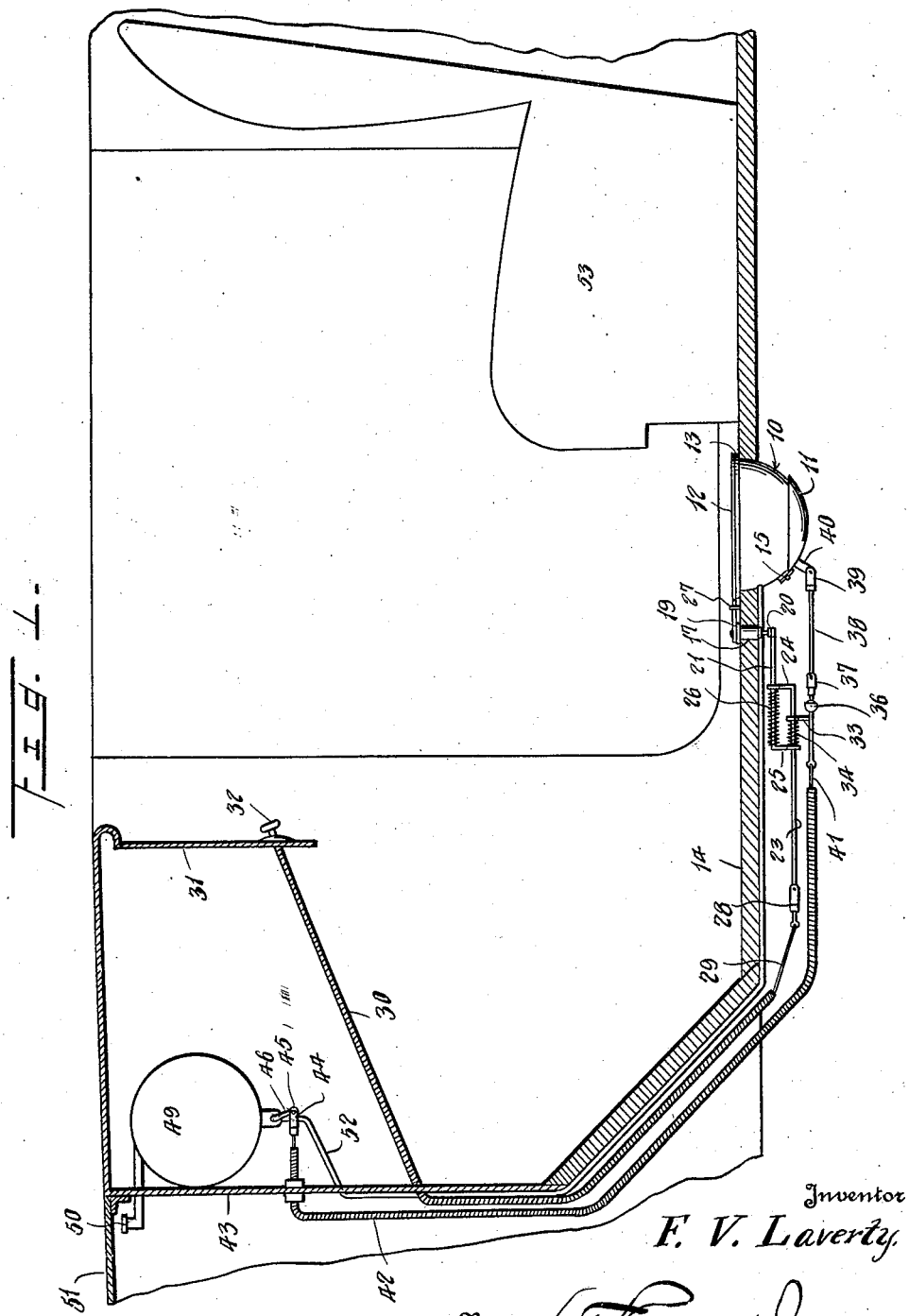
Inventor
F. V. Laverty
By
Attorney

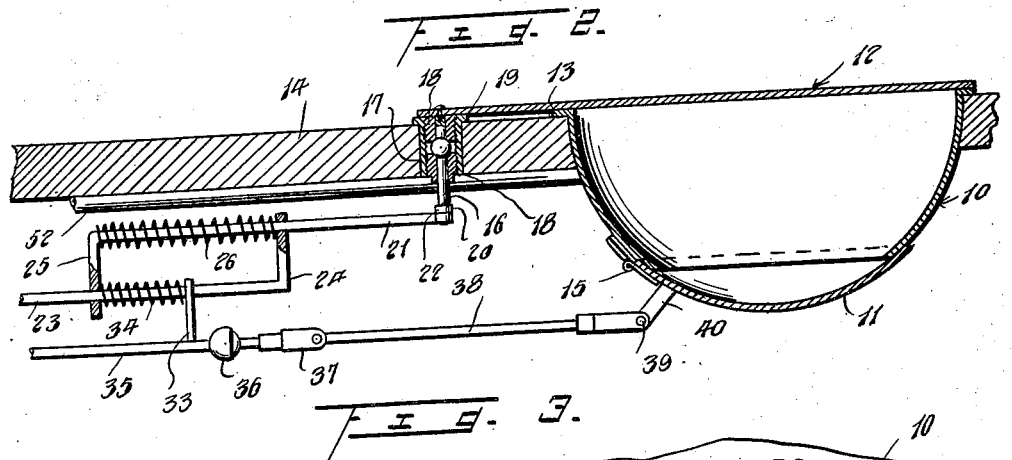

Patented Oct. 29, 1929

1,733,995

UNITED STATES PATENT OFFICE

FRED V. LAVERTY, OF ALTA VISTA, KANSAS

AUTOMOBILE CUSPIDOR

Application filed November 30, 1928. Serial No. 322,822.

This invention relates to a cuspidor for use in automobiles or other vehicles.

It is generally aimed to provide a novel construction which will be sanitary to the maximum extent, convenient for use, which is compact and which occupies minimum space in the automobile without obstructing the floor of the latter.

It is also aimed to provide a construction whereby means are operable to shift the closure for the cuspidor, and to thereafter open the latter and discharge flushing water into the same, under novel control.

Additional objects and advantages will be pointed out in part and become obvious from a consideration of the description following taken in connection with accompanying drawings illustrating an operative embodiment.

In said drawings:—

Figure 1 is a view showing my improvements in side elevation as applied to an automobile, the latter being shown fragmentarily and in longitudinal section, Figure 2 is a view on an enlarged scale taken primarily in central longitudinal section through the cuspidor, Figure 3 is an inverted or bottom plan view of the parts of Figure 2, Figure 4 is an enlarged end elevation of the valve connection for the flush tank, Figure 5 is a sectional view taken on the line 5—5 of Figure 4, and Figure 6 is a detail sectional view taken on the line 6—6 of Figure 5.

In carrying out the invention a cuspidor is employed comprising a bowl section 10, a bottom 11 and a cover or closure 12. The cuspidor section 10 has a flange 13 resting on and secured to the floor 14 of an automobile as conveniently shown in the drawings, such bowl extending through an opening in such floor 14. The bottom closure 11 is connected to the bowl 10 by means of a conventional spring hinge as at 15, which normally urges such bottom 11 into closed position, as shown in Figures 1, 2 and 3. The pintle of hinge 15 is horizontal.

Closure 12 is adapted to be swung laterally over the floor 14 and is carried by a short shaft 16 rigid therewith. A thimble 17 is fastened in the floor 14 and has screw sections 18 threaded interiorly of the same and which engage a ball 19 and serve as bearings therefor. A crank 20 extends laterally from the shaft 16 below the floor 14 and has a shifting rod 21 pivotally connected thereto as at 22.

Another control rod 23 is employed and the rods 21 and 23 have laterally extending ends 24 and 25, respectively, through which the rods 21 and 23 are slidably mounted. An expansive spring 26 surrounds rod 21 between the ends 24 and 25, serving to normally maintain the cover 12 in closed position and to urge its return to that position after operation. The extent of opening of the cover 12 is limited by an abutment as at 27 rising from floor 14.

At the forward end, rod 23 has an adjustable clevis 28 connected thereto to which a flexible metallic draw wire or other element 29 is fastened which is slidably guided by a sheath or tube 30 appropriately mounted on the automobile as shown and connected at the rear to the instrument panel as at 31. Upper terminal of element 29 has a knob 32 fastened to the same which is normally in the position shown in Figure 1 and so maintained by the action of spring 26.

As a result of the construction described, when knob 32 is pulled, the control rods 23 and 21 will actuate crank 20 and rotate shaft 16 and accordingly swing the cover 12 laterally to expose the cuspidor, after release of which knob 32, the spring 26 tensioned through such traced movements will restore the parts to normal position. It will be noted however that a lug 33 is slidably mounted on rod 23 and that an expansive coil spring 34 surrounds the latter rod and bears against the lug 33 and end 25. Such lug 33 is carried by a rod 35 comprising sections connected together by a universal joint as at 26 and one of which sections is a clevis 37 connected to a rod 38 in turn pivoted as at 39 to a lug 40 rigid with the bottom or closure 11 of the cuspidor. Connected to the rod 35 is a flexible metallic wire or other draw element 41 which is slidably mounted and guided in a sheath or tubing 42 suitably fastened on the automobile and passing through the dash board as at 43. The upper end of the draw element 41 is connected to a clevis 44 which in turn is pivotally connected at 45 to a crank 46 carried by a plug valve 47. The plug valve 47 is normally closed and is mounted in a boss 48 constituting the outlet from a flush tank 49 which is appropriately mounted on the automobile for instance under the hood and between the instrument board and dash board 31 and 43 as shown in Figure 1 of the drawings. Such flush tank 49 may be filled with water when desired through a filling tube as at 50, accessible when the hood 51 of the automobile is raised. From the boss 48, a small gage pipe or tube 52, of any suitable material leads, and it is appropriately positioned about the parts of the automobile and extends to bowl section 10.

As a result, a pull on the knob 32 will open closure 12 as previously described and merely a limited movement to effect such opening is sufficient. Further movement of the knob 32 and accordingly element 29 and control rod 23 will cause the end 24 to abut the lug 33 and cause rod 35 to slide to the left correspondingly sliding rod 38 and causing the closure 11 to open against the tension of the spring hinge 15 and at the same time, the movement imparted to the draw element 41, causes the latter to shift clevis 44 and crank 46 and thus rotate the plug valve 47 and open it so that flushing water may escape from the tank 49 into the pipe 52 and then into the bowl, flushing the latter and closure 11 and duly escaping since the latter is open. The valve 47 will automatically return to closed position as will also the bottom 11, when the knob 32 is released, aided by the spring 26 and also by the movement of the end 35 against the spring 34 which moves it into engagement with lug 33, whereby it assists the action of the spring hinge 15.

It will be obvious that the control 32 and bowl 10 may be arranged at any desired location within the automobile. As shown, the bowl is positioned adjacent to the driver's seat as at 53. If the bowl be located in front of one of the rear seats of the automobile, the knob 32 would be arranged at the back of the front seat.

Various changes may be resorted to provided they fall within the spirit and scope of the invention.

I claim as my invention:—

1. In a cuspidor of the class described, a bowl section, a cover therefor, a shaft mounting said cover for lateral swinging movement, a control rod having connection with said shaft, means to operate the control rod, an expansive spring abutting the control rod and said means depressible through the movement necessary to open the cover whereby it will spend its energy to close the cover after release, a bottom for said bowl, and a connection with said means whereby its operation will also open said bottom subsequent to opening of the cover and will also open means for the supply of flushing water to the bowl.

2. In a cuspidor of the class described, a bowl, a cover therefor, a bottom for the bowl, a control rod for operation to open the cover, a control rod slidable relatively to the first mentioned control rod to cause opening movement of the cover, a spring compressible through the movement of the second control rod so that upon release of the latter it may restore the cover to closed position, and means for opening the bottom having slidable connection on the second control rod and adapted to be abutted by a part of the latter to cause opening movement of the bottom.

3. In a cuspidor of the class described, a bowl, a cover therefor, a bottom for the bowl, a control rod for operation to open the cover, a control rod slidable relatively to the first mentioned control rod to cause opening movement of the cover, a spring compressible through the movement of the second control rod so that upon release of the latter it may restore the cover to closed position, means for opening the bottom having slidable connection on the second control rod and adapted to be abutted by a part of the latter to cause opening movement of the bottom, and a spring on the second control rod compressed incidental to the latter movement whereby when the parts are released it will automatically close the bottom, flush tank in communication with the bowl, and a valve in said tank adapted to be opened through the opening movement of the operating means for said bottom.

In testimony whereof I affix my signature.

FRED V. LAVERTY.